United States Patent [19]

Suzuki et al.

[11] Patent Number: 5,011,266

[45] Date of Patent: Apr. 30, 1991

[54] LIQUID CRYSTAL DISPLAY DEVICE

[75] Inventors: Takumi Suzuki; Kiyohiro Uehara, both of Tokyo, Japan

[73] Assignee: Ricoh Company, Ltd., Tokyo, Japan

[21] Appl. No.: 254,774

[22] PCT Filed: Jan. 26, 1988

[86] PCT No.: PCT/JP88/00058

§ 371 Date: Sep. 22, 1988

§ 102(e) Date: Sep. 22, 1988

[30] Foreign Application Priority Data

Jan. 26, 1987 [JP] Japan .................................. 62-9656
May 14, 1987 [JP] Japan .................................. 62-72526
Jul. 28, 1987 [JP] Japan .................................. 62-114663

[51] Int. Cl.⁵ .............................................. G02F 1/133
[52] U.S. Cl. ...................................... 350/335; 350/336
[58] Field of Search ........................ 350/332, 335, 336

[56] References Cited

U.S. PATENT DOCUMENTS 4,474,432 10/1984 Takamatsu et al. ............ 350/336 X
4,549,174 10/1985 Funada et al. .................. 350/336 X
4,772,100 9/1988 Suenaga ............................. 350/336
4,896,946 1/1990 Suzuki et al. ..................... 350/336

FOREIGN PATENT DOCUMENTS 55-79416 6/1980 Japan .
56-47517 4/1981 Japan .
57-93984 7/1982 Japan .
57-197516 12/1982 Japan .
58-126420 8/1983 Japan .
59-94780 5/1984 Japan .
58-149724 10/1988 Japan .

Primary Examiner—Stanley D. Miller
Assistant Examiner—Anita Pellman Gross
Attorney, Agent, or Firm—Oblon, Spivak, McClelland, Maier & Neustadt

[57] ABSTRACT

A multi-layered liquid crystal display device formed by laminating liquid crystal display panels in which two sheets of polymer film substrates each having a transparent electrode on the inside are extended together with the transparent electrodes from a display area outwardly to form electrode lead-out portions wherein the electrode lead-out portions for respective liquid crystal display panels are lead-out in one identical direction, and each of the liquid crystal display panels is connected with an external driving circuit by inserting a predetermined external circuit substrate to the electrode lead-out portions.

5 Claims, 14 Drawing Sheets

LIQUID CRYSTAL DISPLAY DEVICE

TECHNICAL FIELD

The present invention concerns a liquid crystal display device in which polymer film substrates are extended from a display area outwardly to form electrode lead-out portions, an external circuit substrate is inserted between the electrode lead-out portions and the circuit substrate is electrically connected with an external driving circuit.

BACKGROUND ART

Generally, liquid crystal display devices have been utilized in various fields, for example, in office automation equipments or measuring instruments as display devices small in size, reduced in weight and of low electric power consumption. Among these liquid crystal display devices, while those liquid crystal display devices for displaying graphs or letters have a great number of picture elements, those with relatively small number of picture elements have been made into products or studied in recent years for utilizing liquid crystals as the device for controlling the amount of transmission light such as sun visors for use in automobiles, protection spectacles for welding, protection spectacles for laser beam, helmet shields for use in autobicycles, goggles for use in skiing or autobicycles or liquid crystal shutters for use in three-dimensional television sets. Furthermore, those devices having laminated liquid crystal panels have been made into products or studied, for example, liquid crystal protection spectacles for welding, liquid crystal protection spectacles for laser beams and liquid crystal shutters for use in three-dimensional television sets particularly requiring relatively low transmittance and high contrast.

In a conventional multi-layered liquid crystal display device of this type, one end (upper end) of a substrate is extended than the other to form an electrode lead-out portion and a transparent electrodes are formed to the electrode lead-out portion. The transparent electrodes on one side are collectively disposed at the upper end of the substrate for concentrating the electrodes for applying electric fields to the liquid crystal panels and the situation is the same for the other transparent electrodes, in which two-layered liquid crystal display panels prepared by laminating liquid crystal panels are formed. In such two-layered liquid crystal display panel, a connector corresponding to the thickness of the electrode lead-out portions is fitted and electric fields from an external driving circuit are applied to the liquid crystal panels respectively.

However, the conventional multi-layered liquid crystal display panel of this kind, since a polymer film is used as the substrate and electrodes are formed to the substrate to fit the connector, the transparent electrodes on the substrate made of polymer film are poor to the friction as compared with the liquid crystal panel made of glass, there is a problem that the connection reliability is low.

The present inventor has made an earnest study on such a problem and, as a result, has found an effective countermeasure therefor based on a plurality of inventions regarding the liquid crystal display device that the applicant of the present invention has previously proposed.

One of them is a liquid crystal optical device (refer to Japanese Patent Application No. Sho 61-303207), which intends to prevent the intrusion of obstacles in the precutting step to improve the yield by PF-LCD with less number of picture elements (LCD made of polymer film, PF-Liquid Crystal display), and in which electrodes on upper and lower substrates of an identical configuration are extended in one identical direction and an external circuit substrate is inserted between them. According to this system, the electrodes are highly resistive to friction upon insertion of connectors to improve the reliability in the connection when using the electrodes on external circuit substrates, for example, copper electrodes of FPC (plated with solder, gold, nickel, etc.). The other is a liquid crystal display device (Japanese Patent Application No. Sho 62-15779), which intends to prevent the disconnection of the external circuit substrate by flexion, and in which a recess is disposed to electrode lead-out portions to constitute a connection portion with an external circuit substrate.

As another conventional embodiment, there has been a liquid crystal display device with the number of picture element of one, in which an upper transparent electrode and a lower transparent electrode are formed substantially over the entire surface of upper and lower substrates made of a pair of opposed polymer films respectively, and oriented films are formed by orientation treatment. A gap member is scattered between both of the substrates and both of the substrates are bonded by means of an annular seal member. Liquid crystal is sealed within a seal space defined with the seal member, both of the substrates, etc. and this seal range constitutes a display area. The upper substrate and the lower substrate are extended together with the upper and the lower transparent electrodes from the area to constitute upper and lower electrode lead-out portions.

An external circuit substrate is inserted between both of the electrode lead-out portions.

The external circuit substrate is extended and protruded in the direction in perpendicular to the direction of extending both of the electrode lead-out portions and an external driving circuit is electrically connected to the protrusion portion.

By the way, in such a constitution, it is desirable to reduce the thickness of the external circuit substrate.

That is, if the thickness of the external circuit substrate is reduced, the distance between the external circuit substrate and the seal material can be shortened within such a range as not causing the detachment of the seal material, thereby enabling to decrease the size of the device. In this case, the cell gap can not be made so large.

However, in such a constitution, since the thickness of the external circuit substrate is reduced and the external circuit substrate is supported only on one side, the external circuit substrate tends to be flexed at the end of the supported portion thereby possibly causing disconnection. By the way, it may be considered to reinforce the end of the support portion by disposing a coverlay film there. However, since the thickness is increased only in that portion by the disposition of the film and the thickness for the entire external circuit substrate is made uneven, heating and pressing become not uniform to bring about a problem in view of the accuracy for the hot-pressing.

By the way, the liquid crystal display panel is generally constituted with a gap from several microns to several tens microns and, accordingly, the seal member for sealing liquid crystal is formed with the same extent of thickness as that of the gap. Further, if the thickness of the upper and the lower substrates made of the polymer film is set to 0.1 mm, the thickness of the external circuit substrate including the upper external electrode and the lower external electrode, etc. is usually from about 0.1 to 0.2 mm. Accordingly, the thickness of the external circuit substrate is greater than the gap of the seal material and detachment of the seal material from the upper and the lower substrates is prevented by disposing the end of the external circuit substrate with 1 to 2 mm distance from the end of the seal material.

Such a constitution has a merit that the upper and the lower substrates of an identical shape can be used with no undesired effects on the liquid crystal portion, etc. as the constitution of electrode lead-out portions of liquid crystal display panels in which an external circuit substrate that is flexible printed substrate thicker than the gap of the seal material is bonded between two of upper and lower substrates by using heat seal connectors. However, the upper transparent electrode and the lower transparent electrode at the inside of the upper and the lower substrates of a hollow chamber between the seal member and the end of the external circuit substrate may cause short circuit due to the urging force from the outside or due to the deformation of the polymer films caused by the change in the circumstantial temperature and humidity.

For preparing a liquid crystal display device of the conventional example described above, a polymer film attached with a transparent electrode at first cut-into a work size. Then, an electrode pattern is formed, orientation agent is printed and rubbing treatment is applied. Then, cutting referred as pre-cutting is applied to the polymer film to form cutting lines for the upper substrate and cutting lines for the lower substrate. Then, a pair of polymer films formed with such upper and lower cutting lines are appended with each other and then applied with final cutting.

However, in such a conventional liquid crystal display device, since pre-cutting is applied before appending the upper and the lower electrode lead-out portions, film dusts are resulted upon cutting, which may deposit to the orientated films oriented to the upper and the lower transparent electrodes and incorporated as obstacles in the liquid crystals to worsen the performance of the product.

While on the other hand, the device as disclosed in Japanese Utility Model Application No. Sho 61-123537 is adapted such that an electroconductive film from a driving circuit is inserted between transparent electrode substrates, an electroconductive member is disposed between the film and both of the transparent electrode substrates, and the transparent electrode substrates and the driving circuit are electrically connected by way of the film.

However, in such a device, since the gap of the liquid crystal cell, that is, the gap between both of the transparent electrode substrates is several microns, the thickness of the electroconductive film to be inserted in the gap has also to be set to several microns and the actual use of such a thin electroconductive film causes a problem.

The first object of the present invention is to provide a multi-layered liquid crystal display device capable of improving the reliability upon connection with the connector in a simple structure.

The second object of the present invention is to provide a liquid crystal display device capable of preventing the disconnection in the external circuit substrate with no increase in the thickness of the substrate than usual.

The third object of the present invention is to provide means capable of preventing conduction between each of the transparent electrodes on the upper and the lower sides in the space chamber portion between the seal member and the external circuit substrate in a liquid crystal display device, in which upper and lower substrates made of polymer films are extended to constitute connection electrode portions with respect to the external circuit substrate.

The fourth object of the present invention is to provide a liquid crystal display device that can prevent the incorporation of obstacles in the display area, can be manufactured with ease and shows high reliability upon use.

DISCLOSURE OF THE INVENTION

According to the present invention, the first object can be attained by a multi-layered liquid crystal display device formed by laminating liquid crystal display panels in which two sheets of polymer film substrates each having a transparent electrode on the inside are extended together with the transparent electrodes from a display area outwardly to form electrode lead-out portions, wherein the electrode lead-out portions for the respective liquid crystal display panels are led-out in one identical direction, and each of the liquid crystal display panels is connected with an external driving circuit by inserting a predetermined external circuit substrate to the electrode lead-out portions.

In the multi-layered liquid crystal display device according to the present invention, since the external driving circuit is connected by inserting a predetermined external circuit substrate to the electrode lead-out portions in a case of laminating liquid crystal display panels in which two sheets of polymer film substrates are extended from the display area to constitute a pair of electrode lead-out portions, a connection with the external portion can surely be conducted with a simple structure for the electrode lead-out portions, to thereby improve the reliability.

According to the present invention, the second object can be attained by a liquid crystal display device in which two sheets of polymer film substrates each having a transparent electrode on the inside are appended opposed to each other by means of seal material, liquid crystal is sealed within a seal space defined with the seal material and both of the substrates to constitute a display area with the sealed range, the polymer film substrates are extended together with the transparent electrodes from the display area outwardly to form electrode lead-out portions and an external circuit substrate is connected with the electrode lead-out portions, wherein the respective electrode lead-out portions of both of the substrates are extended in one identical direction, a cut-out portion is formed to at least one of both of the electrode lead-out portions, the external circuit substrate is inserted between both of the electrode lead-out portions, a portion of the external circuit substrate is exposed through the cut-out portion of the electrode lead-out portions and the exposed portion is used as the connection portion for the external driving circuit.

In the liquid crystal display device according to the present invention, since the cut-out portion is formed to the electrode lead-out portions, a portion of the external circuit substrate is exposed through the cut-out portion and the external driving circuit is connected with the exposed portion, the exposed portion of the external circuit substrate is supported on the peripheral edge of the cut-out portion and the external circuit substrate less tends to be flexed as compared with the conventional case and, accordingly, it has a useful practical effect capable of preventing the disconnection in the external driving circuit.

According to the present invention, the third object can be attained by a liquid crystal display device in which upper and lower substrates are formed with polymer films, the upper and the lower substrates are extended from a seal portion and an external circuit substrate is inserted and secured to thereby form connection electrode portions, wherein a non-electroconductive spacer is disposed in a hollow chamber portion formed between the seal portion and the external circuit substrate.

Since the liquid crystal display device according to the present invention has an effect capable of surely preventing short circuit in the space chamber between the seal portion disposed for fixing the seal portion and the external circuit substrate, and also has merits of manufacturing and providing a liquid crystal display device improved with the reliability at a reduced cost with no particular increase in the manufacturing steps by utilizing the gap agent as the spacer.

According to the present invention, the fourth object can be attained by a liquid crystal display device in which two sheets of polymer film substrates each having a transparent electrode on the inside are appended opposed to each other by means of a seal member, liquid crystal is sealed within a seal space defined with the seal member and both of the substrates to constitute a display area with the sealed range, the polymer film substrates are extended together with the transparent electrodes from the display area outwardly to form electrode lead-out portions and an external circuit substrate is connected between a pair of the electrode lead-out portions, wherein the respective electrode lead-out portions of both of the substrates are extended in one identical direction, while an external circuit substrate is inserted between both of the electrode lead-out portions, and the external electrode of the external circuit substrate and the transparent electrode of the electrode lead-out portions are electrically connected by thermopress bonding by means of heat seal connectors.

In the liquid crystal display device according to the present invention, since the pre-cutting step as usual can be saved, it can provide a useful practical effect capable of preventing the intrusion of obstacles and manufactured easily by the saving of the steps, as well as the thickness for the external circuit substrate can be secured by the use of the polymer film substrates that enables to make the electrode lead-out portions deformable and, accordingly, connection and fixing can be made with improved reliability.

BRIEF DESCRIPTION OF THE DRAWINGS

FIG. 36 is a cross sectional view illustrating the second embodiment of the device according to the present invention corresponding to FIG. 32, FIG. 37 and FIG. 38 are views illustrating the third embodiment of the device according to the present invention, in which FIG. 37 is a cross sectional view corresponding to FIG. 36, while FIG. 41 through FIG. 45 are views illustrating the conventional liquid crystal display devices as the bases for those from FIG. 32 to FIG. 40, in which FIG. 41 is a plan view for the device, FIG. 42 is a cross sectional view taken along lines XI—XI in FIG. 41, FIG. 43 and FIG. 44 are, respectively, plan views illustrating the pre-cutting step for the polymer film and FIG. 45 is a plan view showing the case of applying the final cutting and FIG. 46 is a plan view illustrating another conventional embodiment.

BEST MODE FOR CARRYING OUT THE INVENTION

For explaining the present invention more specifically, the present invention is to be explained based on preferred embodiments shown in the appended drawings.

The present invention is not restricted to those shown by the embodiments, but can be practiced in various modifications within a range not departing the gist thereof.

Conventional examples of the multi-layered liquid crystal display device are at first explained specifically.

Figure 7:
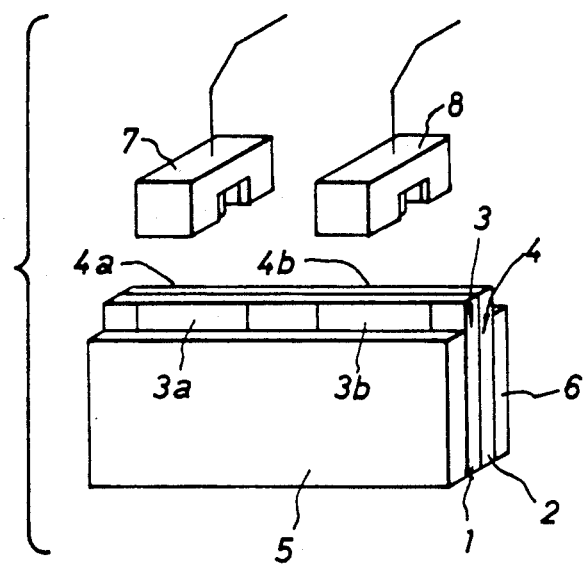
FIG. 7 illustrates a conventional multi-layered liquid crystal display device in its perspective view illustrating the state before connecting the connector.
Figure 8:
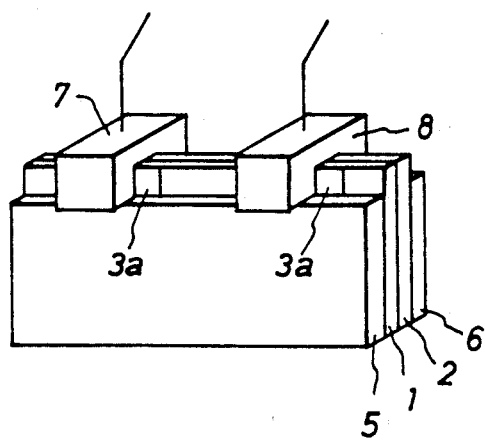
FIG. 8 is a perspective view illustrating the state after connecting the connector to the conventional device.

As the conventional multi-layered liquid crystal display panel of this type, there is, for example, a panel as shown in FIG. 7 and FIG. 8. In FIG. 7, ends on one side (upper end) of substrates 1, 2 each formed with transparent electrode are extended as compared with ends on the other side and formed respectively with electrode lead-out portions 3, 4. Transparent electrodes 3a, 3b, 4a, 4b for applying electric field to liquid crystal panel 5, 6 are respectively formed to the electrode lead-out portions 3, 4. Both of transparent electrodes 3a, 3b on one side are collectively disposed to the upper end of the substrate 1 for concentrating electrodes for applying electric fields to the liquid crystal panel 5 and the situation is the same for the transparent electrodes 4a, 4b on the other side. Accordingly, the structure shown in FIG. 7 constitutes a two-layered liquid crystal display panel formed by laminating the liquid crystal panels 5, 6. Connectors 7, 8 matching with the thickness of the electrode lead-out portions 3, 4 are fit to the two-layered liquid crystal display panel as shown in FIG. 8 and electric fields from an external driving circuit (not illustrated) are applied to the liquid crystal panel 5, 6 respectively. In such a constitution, problems occur as described above regarding the connection of the connector.

Figure 1:
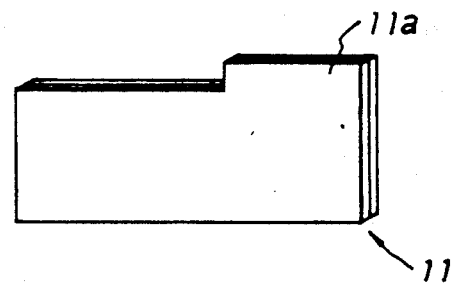
FIG. 1 is a perspective view of an embodiment for a liquid crystal display panel of a multi-layered liquid crystal display device capable of attaining the first object of the present invention.
Figure 2:
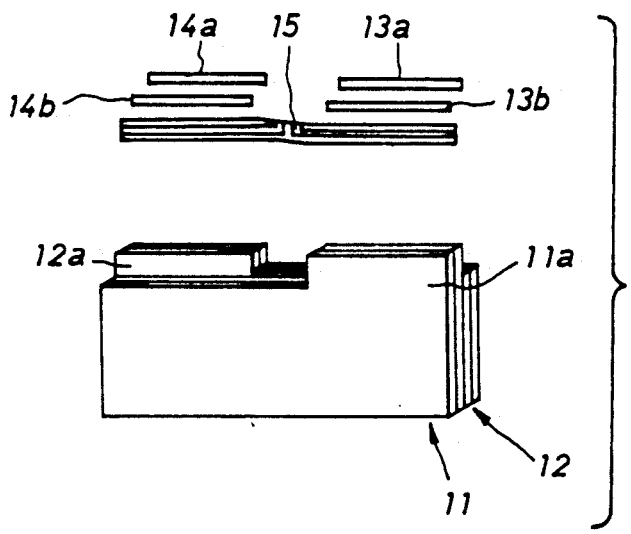
FIG. 2 is a perspective view illustrating the liquid crystal display panels in the stacked state.
Figure 3:
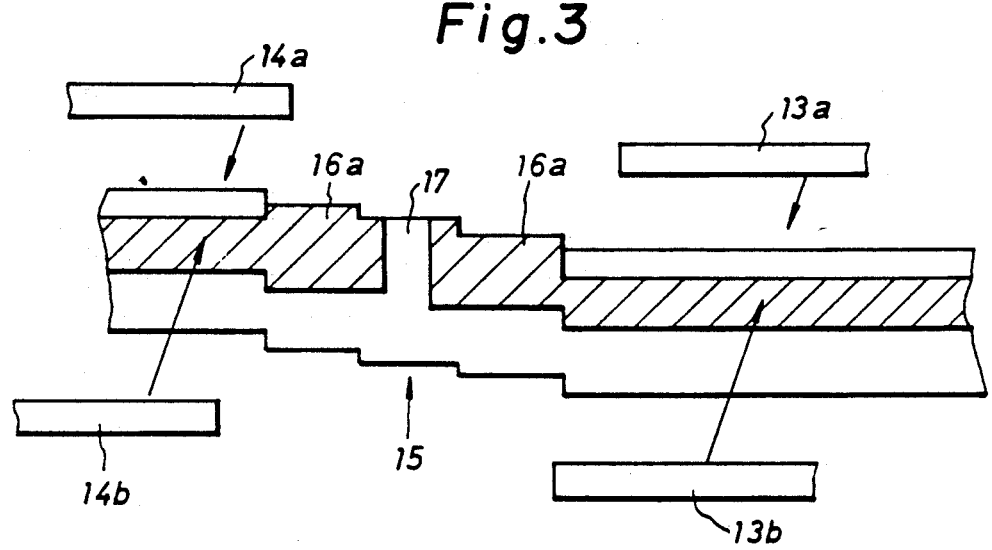
FIG. 3 is an enlarged view for a principal portion of FPC thereof.
Figure 4:
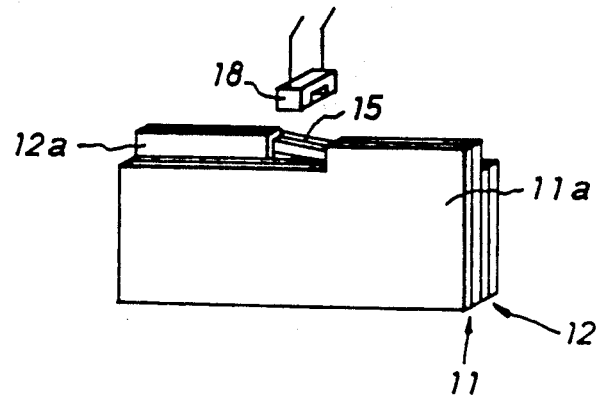
FIG. 4 is a perspective view illustrating the state before a connector is connected to the liquid crystal display panel.
Figure 5:
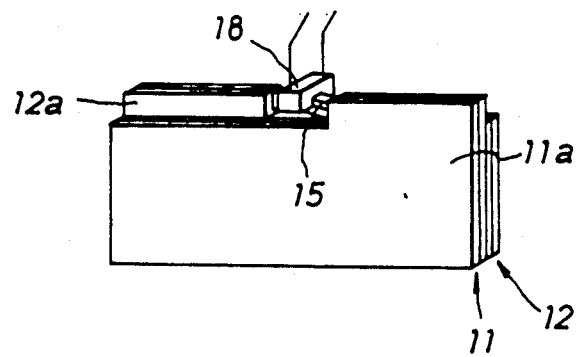
FIG. 5 is a perspective view illustrating the state after connecting the connector to the liquid crystal display panel.

Then, a multi-layered liquid crystal display device capable of attaining the first object of the present invention is to be explained specifically based on embodiments. FIG. 1 through FIG. 5 are views showing one embodiment of the device according to the present invention. In FIG. 1, 11 is a liquid crystal display panel in which two polymer film substrates are extended from a display area to form a pair of electrode lead-out portions 11a. In the multi-layered liquid crystal display panel according to this embodiment as shown in FIG. 2, the same liquid crystal display panel 12 as the liquid crystal display panel 11 are laminated to constitute a multi-layered structure. For the liquid crystal display panel 12, a pair of electrode lead-out portions 12a are formed. A flexible print substrate (hereinafter referred to as FPC) 15 temporarily attached with anisotropically electroconductive film connectors 13a, 13b and 14a, 14b bonded by thermo-press respectively is inserted between each of the electrode lead-out portions 11a and 12a. That is, as shown in an enlarged view near the central portion of FPC 15 in FIG. 3, anisotropically electroconductive film connectors 13a, 13b are temporarily secured and disposed along both sides on the right part of the FPC respectively as shown in FIG. 3 and inserted while being put between a pair of electrode lead-out portions 11a in this provisionally secured state. The situation is the same for the left side portion of the FPC 15. FPC 15 is in a state of bridging the electrode lead-out portions 11a, 12a for each of the adjacent liquid crystal panels 11, 12, and electrodes 16a, 16b plated with copper, solder, gold, nickel, etc. are disposed on both sides of the FPC 15 for electrically connecting an external driving circuit (not illustrated in the figure) and the liquid crystal display panels 11, 12. The FPC 15 may be made of any other material such as polyimide, polyester, glass, epoxy, etc. so long as it is thin and can be inserted between the electrodes of the liquid crystal display panels 11, 12. The state of the FPC 15 put between the electrodes of the liquid crystal display panels 11 and 12 is as shown in FIG. 4, in which a connector 18 is fit to the central portion of the FPC 15 (refer to FIG. 5) and electric fields are applied from the external driving circuit by way of the connector 18.

For the multi-layered liquid crystal display panel of such a constitution, a polymer film attached with a transparent electrode is at first cut into a work size and the end thereof is extended from the display area to form a pair of electrode lead-out portions 12a thereby constitute liquid crystal panels 11, 12 by laminating such panels in two-layers. Then, the FPC 15 formed with the electrodes 16a, 16b by means of etching, etc. is inserted between the electrode lead-out portions 11a and 12a for each of the liquid crystal panels 11 and 12 and the connector 18 is fit to the FPC 15 and electric fields are applied from the external driving circuit. In the case of such a multi-layered liquid crystal display panel, since the FPC 15 is firmly held by being put between the electrode lead-out portions 11a and 12b for each of adjacent liquid crystal display panels 11 and 12, a sufficient strength can be secured and the reliability upon a connection of the connecter 18 can remarkably be improved different from the conventional case. Further, since no pre-cutting step is required for the liquid crystal display panels 11 and 12, the structure is simple and easy to be prepared.

Figure 6:
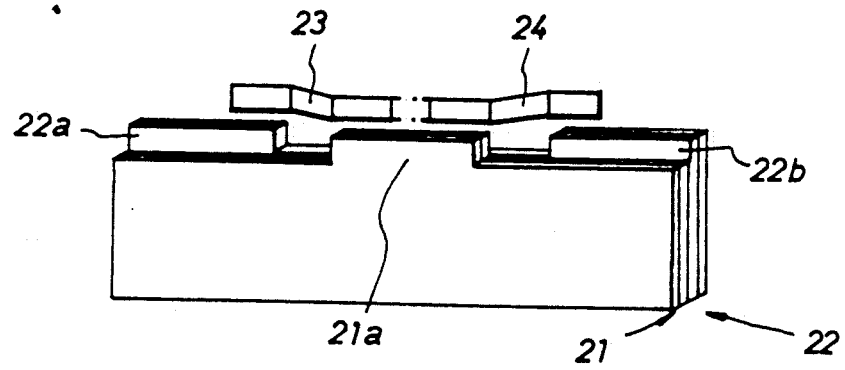
FIG. 6 shows another embodiment of the liquid crystal display panel in the multi-layered liquid crystal display device according to the present invention, in its perspective view illustrating the liquid crystal display panel in the stacked state.

FIG. 6 is a view illustrating another embodiment of the device according to the present invention. This embodiment is a case where the number of electrodes of one of the panels is greater. In FIG. 6, 21, 22 are liquid crystal display panels respectively, in which the liquid crystal display panel 21 has one electrode lead-out portion 21a, whereas the liquid crystal display panel 22 has two electrode lead-out portions 22a and 22b. FPC 23 is inserted to the electrode lead-out portion 21a and the electrode lead-out portion 22a, while FPC 24 is inserted to the electrode lead-out portion 21a and the electrode lead-out portion 22b. Then, connectors (not illustrated) are fitted to the FPC 23 and 24 respectively like that in the first embodiment. By the way, in a case where the number of electrode is increased as in this embodiment, if the inter-electrode distance of adjacent panels is long, the strength of the connector portion (connection portion) of the FPC against the distortion is reduced. However, since the distance between the adjacent electrode lead-out portions 21a, 22a, 22b is set shorter as in the second embodiment, a sufficient strength can be provided for the FPC 23 and 24, thereby capable of obtaining the similar effect to that in the previous embodiment.

Although the FPC is constituted being divided into two parts in this modified embodiment, it may be constituted with one sheet of FPC.

Further, although the external circuit and the panel electrodes are connected by using the anisotropically electroconductive film connector in each of the embodiments described above, this is not limitative but urging connection by means of a clip, etc. is also possible, for instance, as well as soldering may be applied without the connector. Further, FPC may be served also as the connector.

Furthermore, although the two-layered structure is shown in each of the embodiments described above, it is of course possible to constitute in the same way with the multi-layered liquid crystal panels having greater number of layers.

For the liquid crystal display device capable of attaining the second object, explanation is to be made specifically for the liquid crystal display device proposed so far having a picture element by the number of 1, for example, the conventional embodiment shown in FIG. 23 through FIG. 27. In this liquid crystal display device, an upper transparent electrode 33 and a lower transparent electrode 34 are formed substantially over the entire surface of upper and lower substrates 31, 32 comprising a pair of polymer film opposed to each other, respectively, and oriented films 35 are formed by means of orientation treatment. Then, a gap material 36 is scattered between both of the substrates 31 and 32 for securing a distance between them, and both of the substrates 31, 32 are bonded by way of an annular seal member 37.

Liquid crystal 38 is sealed in a sealing space defined with the seal member 37, both of the substrates 31, 32, etc., and the seal range constitutes a display area. The upper substrate 31 and the lower substrate 32 are extended from the area together with the upper and lower transparent electrodes 33 and 34 rightwardly in FIG. 23, to thereby form upper and lower electrode lead-out portions 40, 41 respectively.

Figure 26:
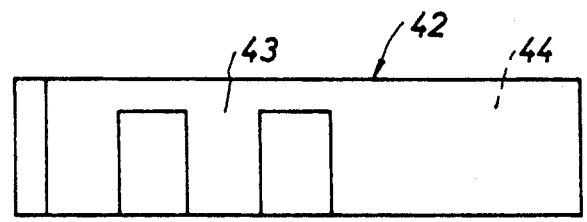
FIG. 26 is a plan view for the external circuit substrate of a conventional liquid crystal display device as the base for FIG. 9–FIG. 25.

An external circuit substrate 42 is inserted between both of the electrode lead-out portions 41 and 42. Specifically, upper and lower external electrodes 43 and 44 are formed on the upper and the lower sides of the external circuit substrate 42. The upper external electrode 43 is bonded to the upper transparent electrode 33 of the upper substrate 31, while the lower external electrode 44 is bonded to the lower transparent electrode 34 of the lower substrate 32 by thermo-press by means of electroconductive heat seal connectors 45 respectively. By the way, the upper and the lower external electrodes 43 and 44 are formed in a comb-like configuration as shown in FIG. 26 such that the binder of the heat seal connector 45 can easily escape.

Figure 27:
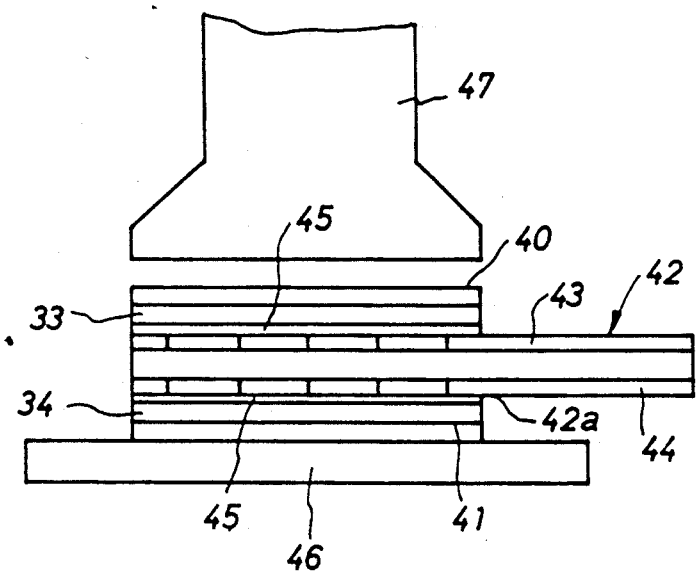
FIG. 27 is a front elevational view illustrating the state of heat-bonding under pressure the external circuit substrate of a conventional liquid crystal display device.

The hot pressing is conducted, as shown in FIG. 27, by inserting an external circuit substrate 42 to which the heat seal connectors 45 have previously been attached provisionally between both of the electrode lead-out portions 40 and 41, placing them on a block 46, lowering a thermal head 47 and melting the head seal connectors 45 to apply hot pressing.

The external circuit substrate 42 is protruded being extended in the direction perpendicular to the direction of extending both of the electrode lead-out portions 40 and 41 and an external driving circuit 49 is electrically connected to the protruded portion 48.

By the way, in such a constitution, it is desired to reduce the thickness $t_1$ of the external circuit substrate 42. That is, if the thickness of the external circuit substrate 42 is reduced, the gap $l_2$ between the external circuit substrate 42 and the seal member 47 can be shortened within such a range as not causing the detachment of the seal member 47 and, as a result, it is possible to decrease the size of the device. In this case, the sell gap $l_1$ can not be made so large.

However, in the constitution as described above, since the thickness of the external circuit substrate 42 is reduced and the external circuit substrate 42 is supported only on one side, the external circuit substrate 42 is tends to be flexed at its portion 42a and, thus, may possibly cause disconnection. By the way, it may be considered to reinforce the portion 42a by disposing a cover-lay film. However, since the disposition of the film increases the thickness of the portion thereby making the entire thickness of the internal circuit substrate 42 not uniform, it causes uneven abutment of the thermal head 47 thus bringing about a problem in view of the accuracy for the thermo-press bonding as described above.

Next, a liquid crystal display device capable of attaining the second object according to the present invention is to be explained referring to an embodiment.

FIG. 9 through FIG. 13 illustrate the first embodiment of the device according to the present invention.

Referring at first to the constitution, reference numerals 51, 52 in the figures represent upper and lower substrates made of polymer films respectively and both of the substrates 51 and 52 are disposed opposed to each other. The upper substrate 51 and the lower substrate 52 are formed to an identical size, in which an upper transparent electrode 53 and a lower transparent electrode 54 are formed substantially over the entire surfaces of the opposing sides of both of the substrates 51 and 52 respectively and oriented films 55 and 56 are formed by orientation treatment. Then, a gap member 57 for maintaining the distance between both of the substrates 51 and 52 to a predetermined length are scattered between both of them, and both of the substrates 51 and 52 are appended opposing to each other by way of an annular seal member 58. Then, liquid crystal 59 is sealed in a seal chamber defined with the seal members 58, both of the substrates 51 and 52, etc. The range in which the liquid crystal 59 is sealed constitutes a display area.

Figure 9:
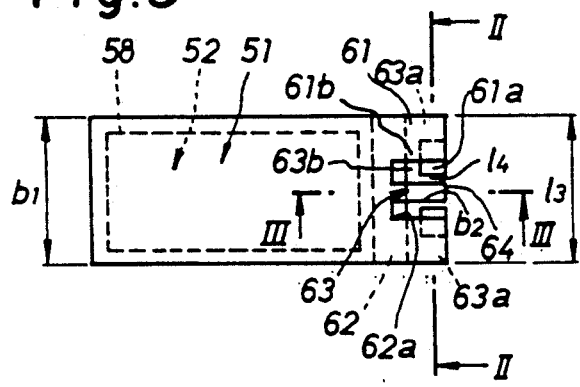
FIG. 9 is a plan view for the first embodiment of a liquid crystal display device capable of attaining the second object according to the present invention.
Figure 10:
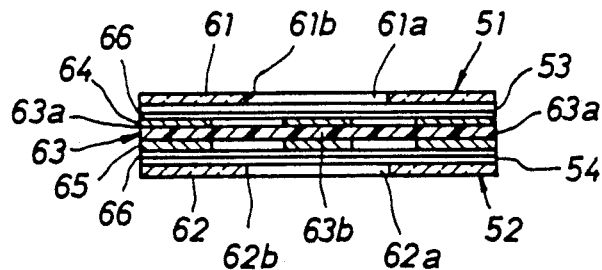
FIG. 10 is a cross sectional view taken along lines II—II in FIG. 9.
Figure 11:
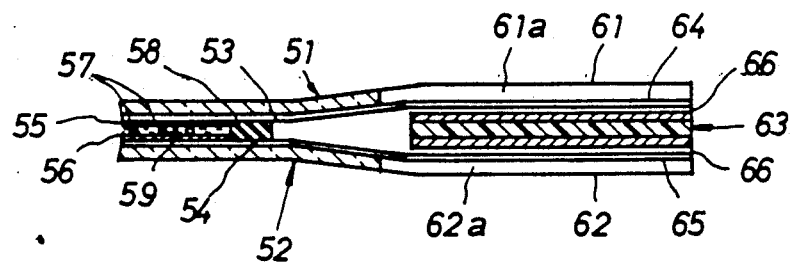
FIG. 11 is a cross sectional view taken along lines III—III in FIG. 9.
Figure 12:
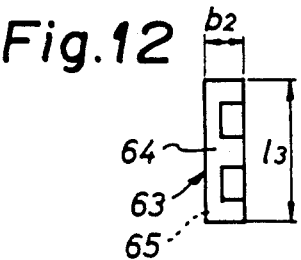
FIG. 12 is a plan view of an external circuit substrate.

Both of the substrates 51 and 52 are extended from the display area rightwardly (in the identical direction) in FIG. 9 to form upper and lower electrode lead-out portions 61 and 62. Rectangular recesses 61a and 62a are formed to both of the electrode lead-out portions 61 and 62 respectively. Then, an external circuit substrate 63 is inserted between both of the electrode lead-out portions 61 and 62. Specifically, the external circuit substrate 63 is prepared by applying an etching treatment to a copper-lined flexible printed substrate (FPC) having a substrate, for example, made of polyimide, polyester film, glass, epoxy, etc. and then applying Ni, Au or solder plating. It is formed substantially in an elongate plate-like shape having the length $l_3$ substantially the same as the width $b_1$ of the substrates 51, 52 and the width $b_2$ formed shorter than the cutting depth $l_4$ of the cut-out portions 61a, 62a. An upper external electrode 64 and a lower external electrode 65 are formed to the upper and the lower sides of the external circuit substrate 63 respectively, and both of the external electrodes 64 and 65 are formed in a comb-like configuration as shown in FIG. 12 so that the binder of the heat seal connectors 66 described later can escape easily. Then, the upper external substrate 64 is bonded to the upper transparent electrode 53 of the upper substrate 51, while the lower external electrode 65 is bonded to the lower transparent electrode 54 of the lower substrate 52 by thermo-press respectively by means of electroconductive heat seal connectors 66. Since the recesses 61a and 62a are formed to both of the electrode lead-out portions 61 and 62, the external circuit substrate 63 disposed between both of the electrode lead-out portions 61 and 62 is supported at both ends 63a thereof on both of the electrode lead-out portions 61, 62 and exposed at the central portion 63b thereof through the cut-out portions 61a and 62b.

Then the central portion 63b as the exposed portion constitutes a connection portion to which the external driving circuit not illustrated is connected.

Figure 13:
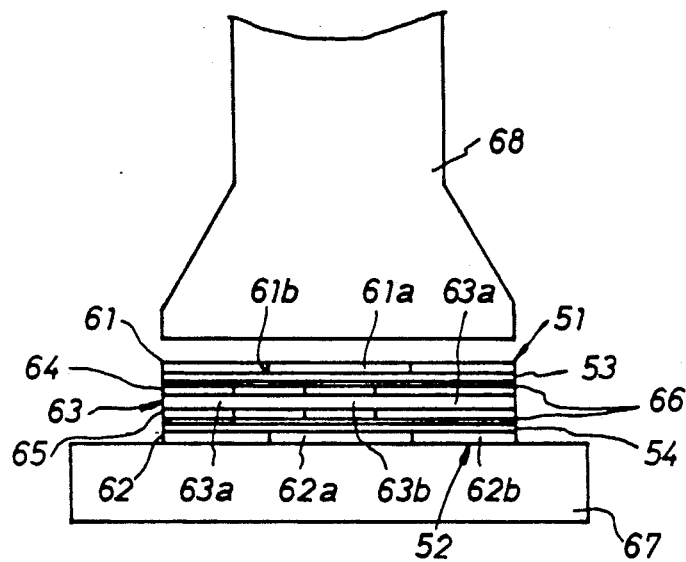
FIG. 13 is a front elevational view illustrating the state of hot-pressing the external circuit substrate.

By the way, when the external circuit substrate 63 is pressed under heating between both of the electrode lead-out portions 61 and 62, heat seal connectors 66 are at first provisionally secured on the respective external electrodes 64 and 65 of the external circuit substrate 63 and then inserted between both of the electrode lead-out portions 61 and 62. Then, they are placed on a previously heated block 67, a thermal head 68 is lowered and the heat seal connectors 66 are heated to apply hot pressing as shown in FIG. 13.

Even in a case where the external circuit substrate 63 is thin, since the central portion 65b to which the external driving circuit is connected is supported at both of the sides 63c thereof on two sides of the peripheral portions 61b and 62b of the cut-out portions 61a, 62a, both of the sides 63c are not flexed and the disconnection can be prevented as compared with the usual case supported only on one side.

By the way, since both of the substrates 51 and 52 are formed with polymer films, there is a merit that the fabrication is easy, upon forming the cut-out portion 61a and 62a.

Figure 14:
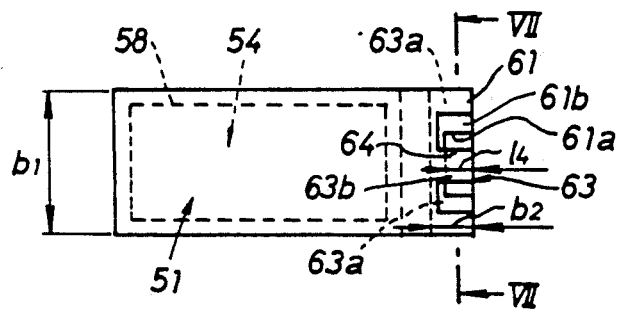
FIG. 14 is a view illustrating the second embodiment of the liquid crystal display device according to the present invention, corresponding to the plan view in FIG. 9.
Figure 15:
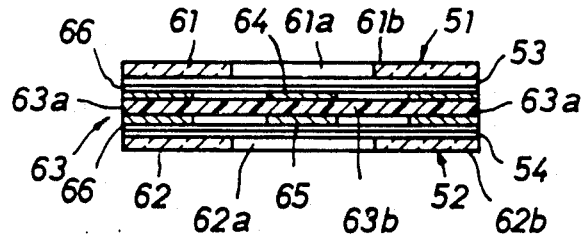
FIG. 15 is a cross sectional view taken along lines VII—VII in FIG. 14.
Figure 16:
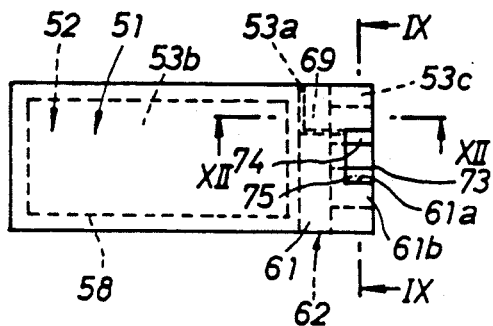
FIG. 16 is a view illustrating the third embodiment of the liquid crystal display device according to the present invention, in its plan view corresponding to that in FIG. 14.
Figure 17:
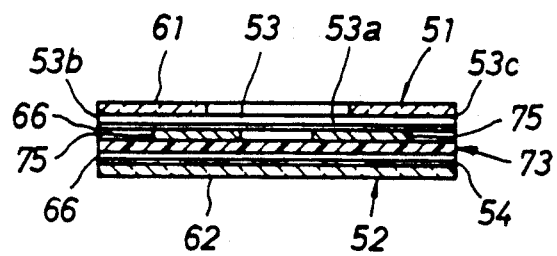
FIG. 17 is a cross sectional view taken along lines IX—IX in FIG. 16.

FIG. 14 and FIG. 15 illustrate the second embodiment of the device according to the present invention.

In this embodiment, the cut-out portions 61a and 62a formed to both of the electrode lead-out portions 61 and 62 are made smaller than those in the first embodiment and the cutting depth $l_4$ is made shorter than the width $b_2$ of the external circuit substrate 63.

In this way, since the central portion 63b of the external circuit substrate 63 is supported on three sides of the peripheral portions 61b and 62b of the cut-out portions 61a and 62a, disconnection of the external circuit substrate 63 can be prevented more surely than that in the first embodiment. At the same time, since the external circuit substrate 63 is present over the entire width $b_1$ between both of the electrode lead-out portions 61 and 62, short circuit caused by the contact between both of the electrode lead-out portions 61 and 62 can be surely prevented.

Since other constitutions and effects are the same as those in the first embodiment, explanations therefor are omitted.

FIG. 16 through FIG. 20 illustrate the third embodiment of the device according to the present invention.

Figures 18, 19:
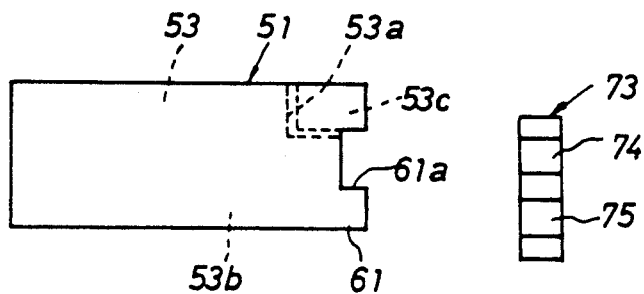
FIG. 18 is a plan view for the upper substrate of the third embodiment of the device according to the present invention.
FIG. 19 is a plan view for the external circuit substrate of the third embodiment of the device.
Figure 20:
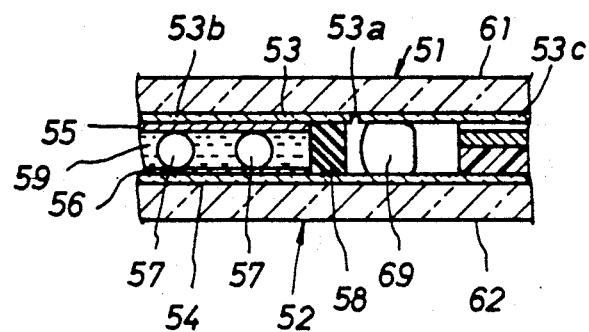
FIG. 20 is a cross sectional view taken along lines XII—XII in FIG. 16, FIG. 21 and FIG. 22 are, respectively, plan views, corresponding to FIG. 16, illustrating the fourth and the fifth embodiments of the liquid crystal display device according to the present invention.

In this embodiment, the cut-out portions are not formed to the lower electrode lead-out portions 62, but a cut-out portion 61a substantially of the same size as that in the second embodiment is formed only to the upper electrode lead-out portion 61. Further, an electrode-removed portion 53a about of an L-shaped configuration is formed to the upper transparent electrode 53 of the upper substrate 51, as shown in FIG. 18, at the upper electrode lead-out portion 61, to divide the upper transparent electrode 53 into an electrode main body 53b and a divided electrode 53c. Then, electroconductive paste 69 is present between both of the electrode lead-out portions 61 and 62 mainly near the outside of the seal member 58 as shown in FIG. 20 to make an electrical conduction between the lower transparent electrode 54 and the divided electrode portion 53c. While on the other hand, an external circuit substrate 73 is divided, as shown in FIG. 19, mainly at the upper outer electrodes 74 and 75 as shown in FIG. 19, in which the upper external electrode 74 is connected with the upper transparent electrode 53 on one hand and the upper external electrode 75 is connected to the divided electrode portion 53c on the other hand. At the same time, both of the upper external electrodes 74 and 75 are partially exposed through the cut-out portion 61a to be connected with an external driving circuit not illustrated. Electrodes are not formed below the external circuit substrate 73.

In this way, since the cut-out portion 61a is formed only in the upper electrode lead-out portion 61 and not formed in the lower electrode lead-out portion 62, the lower side of the external circuit substrate 73 is supported substantially over the enter surface and, accordingly, it is less flexed and the effect of preventing the disconnection can further be improved.

Since other constitutions and effects are the same as those in the second embodiment, explanations therefor are omitted.

Figure 21:
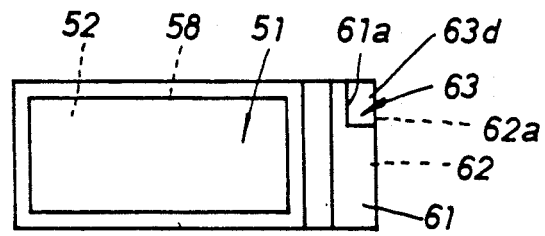
Figure 22:
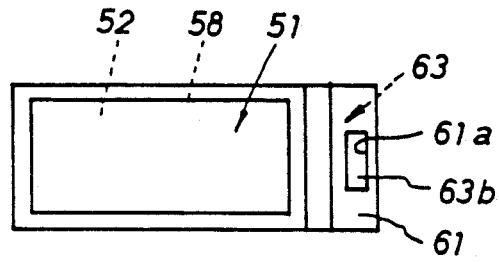
Figure 23:
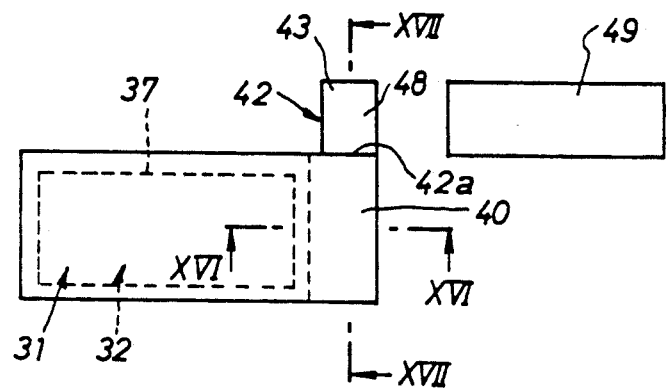
FIG. 23 is a view illustrating the liquid crystal device proposed so far as a plan view of the device.
Figure 24:
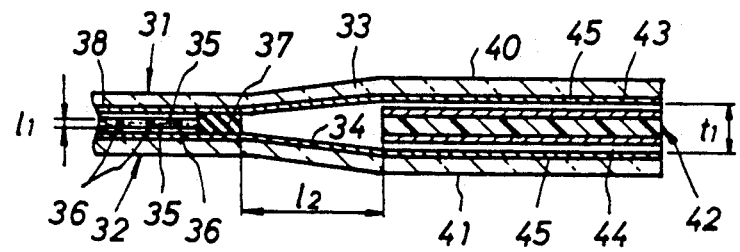
FIG. 24 and FIG. 25 are, respectively, cross sectional views taken along lines XVI—XVI and lines XVII—XVII in FIG. 23.
Figure 25:
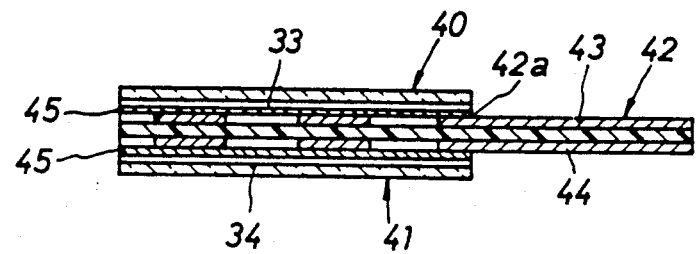

Further, FIG. 21 and FIG. 22 illustrate, respectively, the fourth and the fifth embodiments of the devices according to the present invention.

In the fourth embodiment shown in FIG. 21, rectangular cut-out portions 61a and 62b are formed at the corners of both of the electrode lead-out portions 61 and 62. The corner 63d of an external circuit substrate 63 exposed through the cut-out portions 61a and 62a (exposed portion) is supported on two sides in perpendicular with each other, i.e., peripheral portions 61b and 62b of the cut-out portions 61a and 62a.

By forming the cut-out portions 61a and 62a to the corner, the external driving circuit can easily be connected to the corner 63d of the external circuit substrate 63.

In the fifth embodiment shown in FIG. 22, rectangular hole-like cut-out portions 61a and 62a are formed about at the central portion of both of the electrode lead-out portions 61 and 62.

With such a constitution, since the central portion 63b of an external circuit substrate 63 is formed on four sides of the peripheral portions 61b and 62b of the cut-out portions 61a and 62a, the supporting strength can further be improved than each of the embodiments described above.

Since other constitutions and effects are the same as those in the first embodiment, explanations therefor are omitted.

Then, before explanating the liquid crystal display device capable of attaining the third object of the present invention, a conventional embodiment for the device is to be explained specifically.

Figure 31:
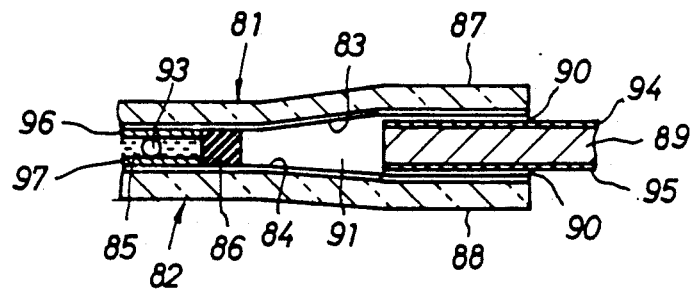
FIG. 31 is a cross sectional view for the liquid crystal display device as the base of the present invention.

The present applicant has developed a constitution for the electrode lead-out portion having a novel feature in connection with the external circuit substrate in the liquid crystal display device as shown in FIG. 31. That is, this concerns a constitution for the electrode lead-out portion in the liquid crystal display device in which polymer films are used for the upper and lower substrates 81 and 82 in the liquid crystal display device, the upper and the lower substrate 81 and 82 are extended from a seal member 86 to constitute electrode lead-out portions 87 and 88, so that an external circuit substrate 89 of a thickness greater than the seal member 86 can be mounted between the upper and the lower substrates 81 and 82 with no undesired effects on the sealing state with the seal member 86 upon mounting.

A usual liquid crystal display device is constituted with a gap of a several $\mu m$ or several tens $\mu m$ and, accordingly, the seal member 86 is formed with the same extent of thickness as that of the gap. Further, if the thickness of the upper and the lower substrates 81 and 82 made of the polymer film is 0.1 mm, the thickness of the external circuit substrate 89 including the upper outer external electrode 94 and the lower external electrode 95, etc. is usually about from 0.1 to 0.2 mm. Then, since the thickness of the external circuit substrate 89 is larger than the gap for the seal member 86, the end of the external circuit substrate 89 is disposed with 1–2 mm distance from the end of the seal member 86, so that defoliation of the seal member 86 from the upper and the lower substrates 81 and 82 may be prevented. Accordingly, in such a constitution, there is a problem that short circuit caused by the deformation of the polymer films may be caused as described above.

Then, the embodiment of the device according to the present invention is to be explained.

Figure 28:
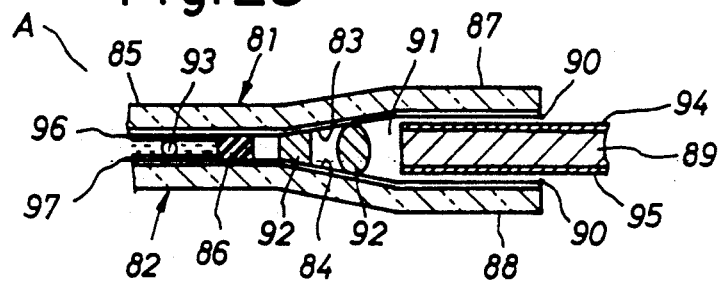
FIG. 28 is a cross sectional view illustrating an embodiment for a liquid crystal display device capable of attaining the third object according to the present invention.
Figure 29:
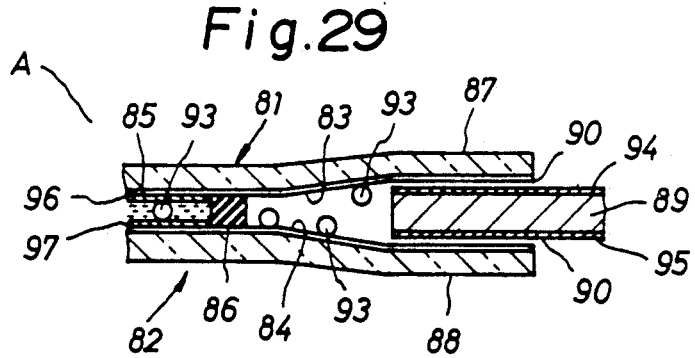
FIG. 29 is a cross sectional view illustrating another embodiment of the liquid crystal display device according to the present invention.
Figure 30:
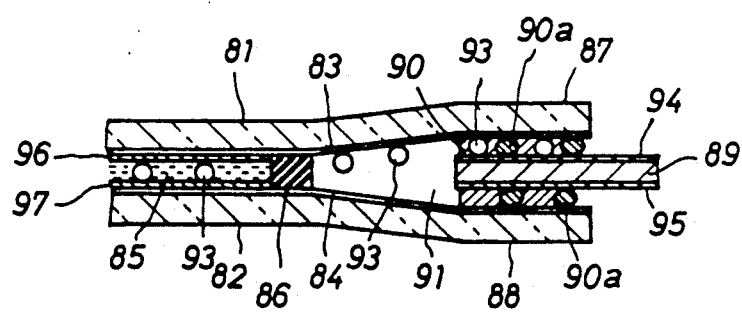
FIG. 30 is a cross sectional view illustrating a modified embodiment of FIG. 29.

Next, in In FIG. 28 through FIG. 30, a liquid crystal display device A is constituted with upper and lower substrates 81 and 82 made of polymer films, an upper transparent electrode 83 and a lower transparent electrode 84 are formed on the opposing surfaces thereof, the gap between the upper and the lower substrates 81 and 82 is made to about from several microns to several tens microns and the liquid crystal 85 is introduced therebetween and sealed by a seal member 86.

The upper and the lower substrates 81 and 82 are extended to form an upper electrode lead-out portion 87 and a lower electrode lead-out portion 88 in the liquid crystal display device A, in which an external substrate 89 (of about 0.1 mm–0.2 mm thickness) thicker than that of the upper and the lower substrates 81 and 82 (about 0.1 mm) are hot pressed by means of heat seal connectors 90 and 90.

Reference 91 is an elongate states chamber formed between the seal member 86 and the end of the external circuit substrate 89 and 92 is a spacer made of non-conductive material, 93 is a gap member, 94 and 95 are upper external electrode and lower external electrode of the external circuit substrate 89, and 96 and 97 are oriented layers formed to the upper transparent electrode 83 and the lower transparent electrode 84 in the liquid crystal display portion.

In the present invention, as shown in FIG. 28, the non-electroconductive material 92 made of plastic, paper, glass, etc. is inserted as a spacer within the elongate space chamber 91 formed between the seal member 86 and the end of the external circuit substrate 89 joined by the heat seal connectors 90 and 90 for preventing the short circuit between the transparent electrodes 83 and 84 in the space chamber 91. The sizes of the non-electroconductive material 92 is such that it can always be in contact with the upper transparent electrode 83 and the lower transparent electrode 84 as shown in the figure or it may be smaller than the gap between the upper and the lower transparent electrodes 83 and 84. In short, the size of the spacer has no particular restrictions so long as it can hinder the contact between the upper transparent electrode 83 and the lower transparent electrode 84 if the upper and the lower substrates should deform.

In FIG. 29, the gap member 93 disposed in the liquid crystal 85 is scattered as the spacer in the elongate space chamber 91, at the inner surface of the transparent electrodes 83 and 84 of the upper and the lower substrates 81 and 82 till the end position of the external circuit substrate 89. The gap member 93 situated at the transparent electrodes 83 and 84 of the upper and the lower substrates 81 and 82 present in the space chamber 91 can prevent the short circuit between the transparent electrodes 83 and 84 following after the deformation of the upper and the lower substrates 81 and 82. The upper and the lower electrodes 94 and 95 of the external circuit substrate 89 are connected with the transparent electrodes 83 and 84 of the upper and the lower substrates 81 and 82 by disposing the heat seal connectors 90 and 90 between the upper external electrode 94, lower external electrode 95 of the external circuit substrate 89 and the upper transparent electrode 83 of the upper substrate 81, the lower transparent electrode 84 of the lower substrate 82 respectively and applying hot-pressing. In this case, the heat seal connectors 90 and 90 composed of binder and electroconductive particles makes electric conduction by the presence of electroconductive particles between the two electrodes and, for preventing the gap member 93 made of non-electroconductive material from being scattered to the electrode lead-out portions 87 and 88 bonded with the heat seal connectors 90 and 90, it is desirable to apply masking for the upper transparent electrode 83 and the lower transparent electrode 84 at the positions corresponding to the electrode lead-out portions 87 and 88.

Furthermore, by making the diameter of the electroconductive particles in the heat seal connectors 90 and 90 greater than the diameter of the gap member 93 scattered on the surfaces of the transparent electrodes 83 and 84 of the upper and the lower substrates 81 and 82, the heat seal connectors 90 and 90 are free from the effect caused by the presence of the conductive particles 90a greater than the diameter of the gap member 93 can make electroconduction between the two upper electrodes 83 and 94, and between the two lower electrodes 84 and 95 as shown in FIG. 30. Accordingly, by selecting the diameter of the electroconductive particles 90a of the heat seal connector 90 larger than the diameter of the gap member 93, the gap member 93 can be scattered on the respective transparent electrodes 83 and 84 of the upper and the lower substrates, 81 and 82 with no requirement for the masking on the electrode portion as in the case of FIG. 29. According to such a way, the gap member can be scattered to the transparent electrodes of the upper and the lower substrates without increasing the number of steps in the cell manufacturing step, the gap member in the elongate space chamber between the external circuit substrate and the seal portion can prevent short circuit between the upper and the lower transparent electrodes in the space chamber, as well as the gap member situated above and below the external circuit substrate can be situated between each of the electroconductive particles without giving undesired effects on the function of the electroconductive particles of the heat seal connectors.

In an elongate space chamber formed between the seal portion and the external circuit substrate, the upper and the lower transparent electrodes can be inhibited from approaching with each other and short circuits between the transparent electrodes can be prevented even if deformation of the upper and the lower substrates and other displacement should occur due to the disposition of the spacer as described above.

A conventional embodiment regarding the liquid crystal display device capable of attaining the fourth object of the present invention is to be described specifically.

There are conventional embodiment, for example, as shown from FIG. 41 through FIG. 45. The liquid display device has a picture element, for example, by the number of one, in which an upper transparent electrode 103 and a lower transparent electrode 104 are formed substantially over the entire surfaces of a pair of upper and lower substrates 101 and 102 made of polymer films opposed to each other, and oriented films 105 are formed by means of orientation treatment. Then, a gap member 106 for securing the distance between both of the substrates 101 and 102 is scattered between both of them and both of the substrates 101 and 102 are bonded by means of an annular seal member 107. Liquid crystal 108 is sealed within a seal space defined with the seal member 107, both of the substrates 101 and 102, etc. and the seal range constitutes a display area 109 as shown by the dotted chain in FIG. 41. The upper substrate 101 is extended together with the upper transparent electrode 103 from the area 109 downwardly and upwardly in FIG. 41 to constitute an upper electrode lead-out portion 110, while the lower substrate 102 is extended together with the lower transparent electrode 104 rightwardly in the figure to constitute a lower electrode lead-out portion 111. In other words, the size of both of the substrates 101 and 102 are made different in order to form both of the electrode lead-out portions 110 and 111.

Figure 43:
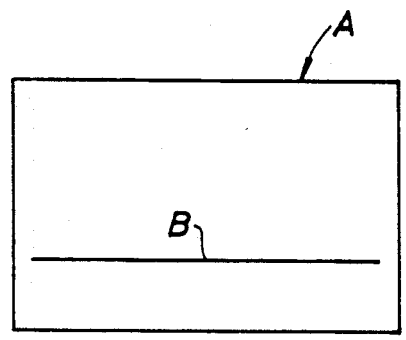
Figure 44:
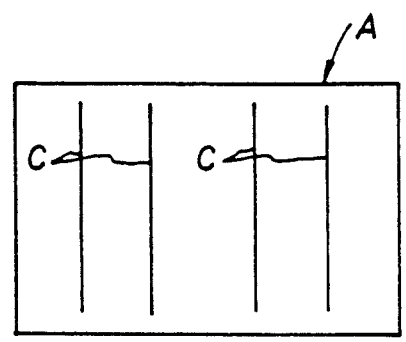
Figure 45:
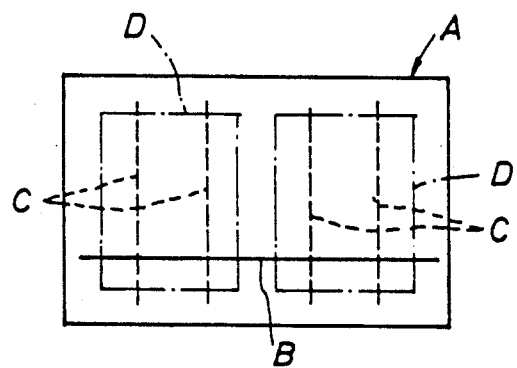

For preparing such a liquid crystal display device, a polymer film attached with a transparent electrode is at first cut into a work size as shown in FIG. 43 and FIG. 44. An electrode pattern is formed, an orientation agent is printed and rubbing treatment is applied. Then, as shown in FIG. 43 and FIG. 44, cutting referred to as pre-cutting is applied to the polymer film A and a cutting line B for the upper substrate or a cutting line C for the lower substrate are formed. Then, after appending a pair of polymer films A formed with the cutting lines B, C in this way as shown in FIG. 45, final cutting is applied as shown by the dotted chain D in the figure.

Figure 46:
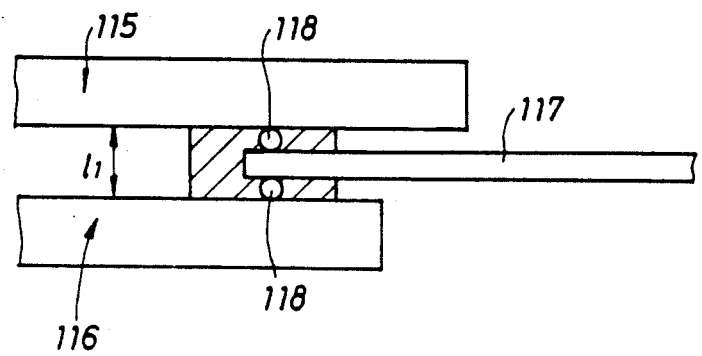

While on the other hand, the device shown in FIG. 46 described in Japanese Utility Model Application Laid-Open No. Sho 61-123537 as described above is constituted such that an electroconductive film 117 from a driving circuit not illustrated in the drawing is inserted between the transparent electrode substrates 115 and 116, an electroconductive member 118 is disposed between the film 117 and each of the transparent electrode substrates 115 and 116 and the transparent electrode substrates 115 and 116 are electrically connected with the driving circuit by means of the film 117.

However, in such a device, since the gap of the liquid crystal cell, that is, the gap $l_1$ between both of the transparent electrode substrates 115 and 116 is several microns, the thickness of the electroconductive film 117 inserted in the gap $l_1$ has also to be set to several microns. However, such a thin electroconductive film 117 involves problems upon practical use.

A liquid crystal display device capable of attaining the foregoing fourth object of the present invention is to be described referring to an embodiment.

FIG. 32 through FIG. 35 are views illustrating the first embodiment of the device according to the present invention.

Referring at first to the constitution, the references 121 and 122 in the drawing are upper and lower substrates made of polymer films respectively and both of the substrates 121 and 122 are disposed opposed to each other. The upper substrate 121 and the lower substrate 122 are formed to an identical size and an upper transparent electrode 123 and a lower transparent electrode 124 are formed substantially over the entire surface of the opposing sides of the substrates 121 and 122, and orientation films 125 and 126 are formed by orientation treatment. A gap agent 127 is scattered between both of the substrates 121 and 122 for keeping the distance between both of them to a predetermined length, and both of the substrates 121 and 122 are appended opposed to each other by means of an annular seal member 128. Thus, liquid crystal 129 is sealed within a seal chamber defined with the seal member 128, both of the substrates 121 and 122, etc.

Figure 32:
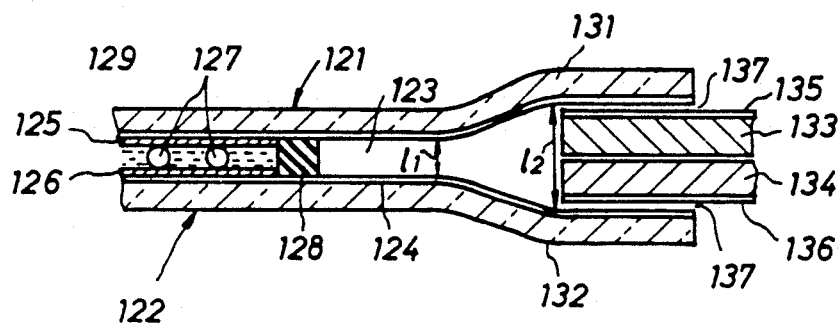
FIG. 32 is a view illustrating a first embodiment of the liquid crystal display device capable of attaining the fourth object according to the present invention, in its cross sectional view illustrating a principal portion of the first embodiment.
Figure 33:
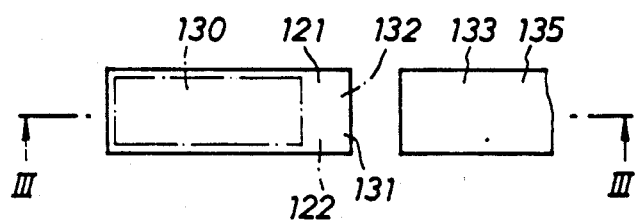
FIG. 33 is a plan view illustrating the state before connecting the external circuit substrate of the first embodiment.
Figure 34:
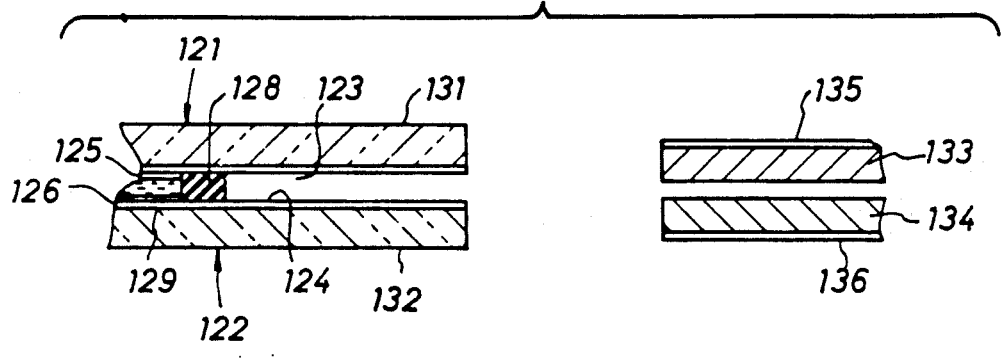
FIG. 34 is a cross sectional view taken along lines III—III in FIG. 33.

The area in which the liquid crystal 129 is sealed, that is, the range shown by the dotted chain in FIG. 33 constitutes a display area 130. The area 130 shows the size of the picture element. Then, the upper substrate 121 and the lower substrate 122 are extended from the display area 130 rightwardly in FIG. 33 to form upper and lower electrode lead-out portions 131 and 132. First and second external circuit substrates 133 and 134 are inserted between both of the electrode lead-out portions 131 and the 132 as shown in FIG. 32. Specifically, an upper external electrode 135 and a lower electrode 136 are formed on the upper side or the lower side of both of the external circuit substrates 133 and 134. The upper external electrode 135 is bonded to the upper transparent electrode 123 of the upper substrate 121, while the lower external electrode 136 is bonded to the lower transparent electrode 124 of the lower substrate 122 by thermo-press by means of electroconductive heat seal connectors 137 respectively. In this case, both of the external circuit substrates 131 and 134 are set to such a predetermined thickness as not to be too thin. Accordingly, since both of the external circuit substrates 133 and 134 are formed thicker than the distance $l_1$ (several microns) between both of the substrates 121 and 122 in the display area 130, both of the substrates 121 and 122 being formed with the polymer films have flexibility in a state where both of the external circuit substrates 133 and 134 are inserted between both of the electrode lead-out portions 131 and 132 and, accordingly, the distance $l_2$ between both of the electrode lead-out portions 131 and 132 is made broader than the gap $l_1$ at the display area 130 as shown in FIG. 32.

Figure 35:
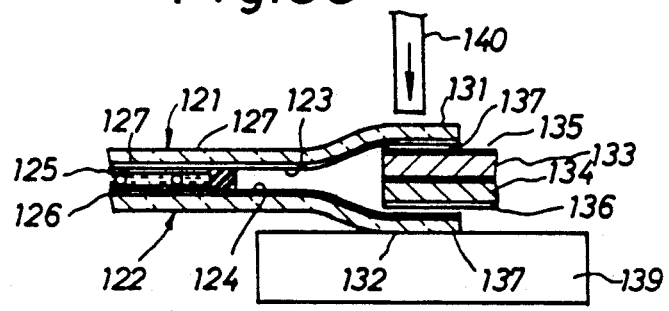
FIG. 35 is a cross sectional illustrating the state of hot pressing by using the heat seal connector of the first embodiment.

For thermo-pressing both of the external circuit substrates 133 and 134 between both of the electrode lead-out portions 131 and 132 of the liquid crystal display device having such a structure, heat seal connectors 137 are provisionarily secured on respective external electrodes 135 and 136 of both of the external circuit substrates 133 and 134 and then inserted between both of the electrode lead-out portions 131 and 132. Then, they are placed on a previously heated block 139 and a thermal head 140 is lowered in the direction of an arrow and a heat seal connectors 137 are heated to apply thermopress bonding as shown in FIG. 35.

In this way, by inserting and connecting external circuit substrates 133 and 134 between both of the electrode lead-out portions 131 and 132, since there is no requirement for extending both of the electrode lead-out portions 131 and 132 in different directions as in the usual case, precutting step is no more necessary and, accordingly, intrusion of obstacles in liquid crystal 129 can be prevented and, at the same time, the number of production steps can be reduced to improve the productivity.

Furthermore, by using the polymer film having the flexibility as the substrates 121 and 122, since both of the electrode lead-out portions 131 and 132 are deformed when both of the external circuit substrates 133 and 134 are inserted between both of the electrode lead-out portions 131 and 132 of both of the substrates 121 and 122, the thickness of both of the external circuit substrates 133 and 134 can be secured, different from the conventional case, to enable to apply connection and securing with improved reliability.

Figure 36:
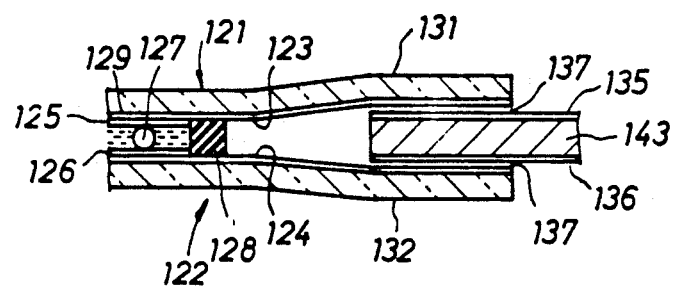

FIG. 36 illustrates the second embodiment of the device according to the present invention.

In this embodiment, an upper external electrode 135 and a lower external electrode 136 are formed on upper and lower sides of a sheet of an external circuit substrate 143. In this constitution, since the external circuit substrate 143 comprises one sheet, material cost, etc. can be reduced as compared with that in the first embodiment. Furthermore, if the external circuit substrate 143 used is made as thin as possible while securing the strength thereof, it is possible to heat both of the heat seal connectors 137 simultaneously by one thermal head 140 to thereby manufacture a liquid crystal display device in a short step time.

Since other constitutions and effects are the same as those in the first embodiment, explanations therefor are omitted.

Figure 37:
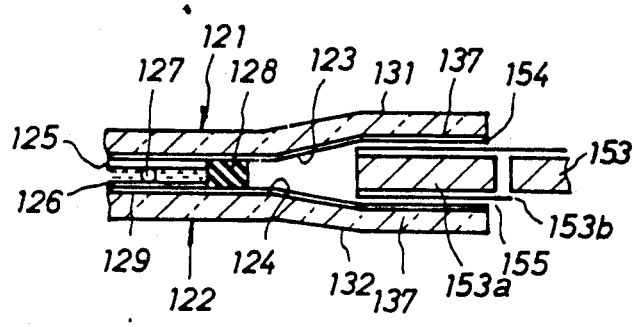
Figure 38:
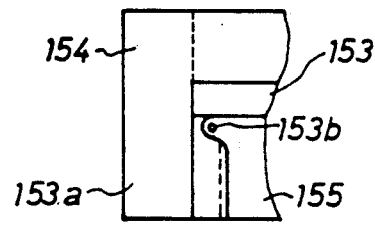
FIG. 38 is a plan view showing the external circuit substrate for the third embodiment.

Furthermore, FIG. 37 and FIG. 38 illustrate the third embodiment of the device according to the present invention.

In this embodiment, the external circuit substrate 153 is improved. That is, an upper external electrode 154 and a lower external electrode 155 are formed on the upper and lower sides in the insertion portion 153a between both of the electrode lead-out portions 131 and 132, as well as a through-hole 153b is formed to the outside of the insertion portion 153a, and the lower external substrate 155 is extended through the throughhole 153b to the upper surface of the external circuit substrate 153, and an upper external electrode 154 and a lower external electrode 155 are formed, as shown in FIG. 38, to the upper surface other than the insertion portion 153a. If the upper external electrode 154 and the lower external electrode 155 are formed on one surface, there is a merit that the external circuit substrate 153 can be connected to other external circuits more easily as compared with the case where both of the electrodes 154 and 155 are formed on both surfaces.

Since other constitutions and effects are the same as those in the fist embodiment, explanations therefor are omitted.

Figure 39:
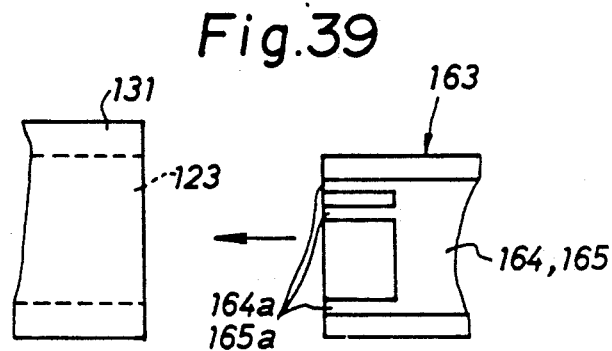
FIG. 39 shows the fourth embodiment of the device according to the present invention, in its plan view illustrating the state before connecting the external circuit substrate.
Figure 40:
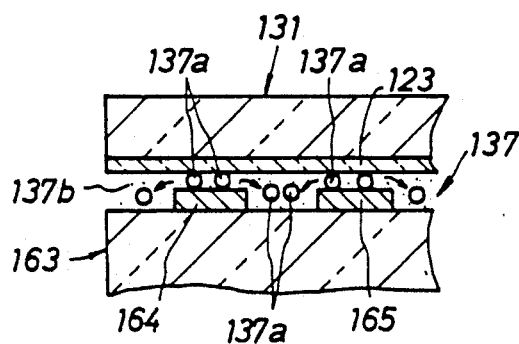
FIG. 40 is a cross sectional view illustrating the state of connecting the external circuit substrate in the fourth embodiment of the device according to the present invention.
Figure 41:
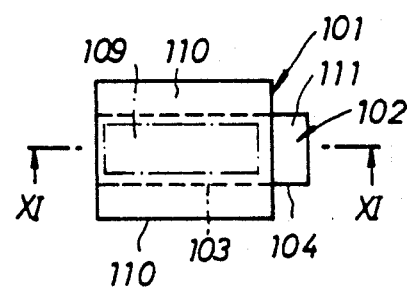
Figure 42:
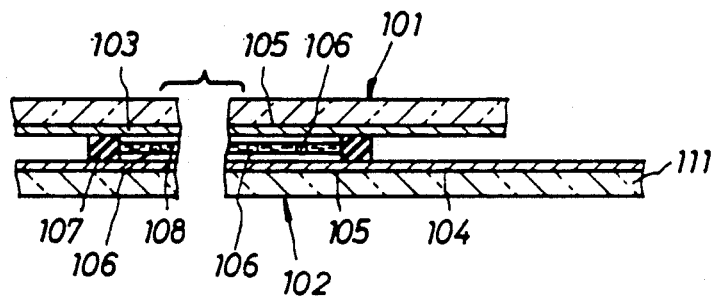

Furthermore, FIG. 39a and FIG. 40 illustrate the fourth embodiment of the device according to the present invention. In this embodiment, upper and lower external electrodes 164 and 165 of an external circuit substrates 163 are improved in a case of the cell having a relatively small number of picture elements. That is, the connection portions 164a and 165a of the external electrodes 164 and 165 with the upper and the lower transparent electrodes 123 and 124 are shaped in a comb-like configuration as shown in FIG. 39.

In a case where the number of picture elements is small, the area for both of the transparent electrodes 123 and 124 in both of electrodes lead-out portions 131 and 132 is made larger. In the case of hot-pressing both of such transparent electrodes 123 and 124 and both of external electrodes 164 and 165 by way of heat seal connectors 137 composed of metal particles 137a and binder 137b as shown in FIG. 40, if the connection portions 164a and 165a for both of the external electrodes 164 and 165 in a comb-like configuration, the binder 137b tends to easily escape from the gap between the connection portions 164a and 165a and both of the transparent electrodes 123 and 124. As a result, the gap between the connection portions 164a and 165a and both of the transparent electrodes 123 and 124 can be brought closer to the grain size of the electroconductive particles 137a as the electroconductive member, and stable conductivity can be secured for both of them by means of the electroconductive particles 137a. By the way, in a case where they are not formed into the comblike configuration, since the contact area between both of the transparent electrodes 123 and 124 and the connection portions 164a and 165a is large, the binder 137a tends to escape easily and, accordingly, the gap between both of them can not some time be brought closer to the particle size of the electroconductive particle 137a, in which no stable conductivity may possibly be obtained.

Since other constitutions and effects are the same as those in the first embodiment, explanations therefor are omitted.

We claim:

1. A multi-layered liquid crystal display device, comprising:

liquid crystal display panels each including two sheets of polymer films kept apart from each other, and two transparent electrodes laminated respectively with inside surfaces of said respective polymer films, said inside surfaces facing each other;

two first electrode lead-out portions extending respectively together with said two transparent electrodes of one of said liquid crystal display panels in one identical direction outwardly from a display area of said one of said liquid crystal display panels;

two second electrode lead-out portions extending respectively together with said two transparent electrodes of the other of said liquid crystal display panels in one identical direction outwardly from a display area of said other of said liquid crystal panels;

an external circuit substrate inserted between said first electrode lead-out portions at one portion thereof and inserted between said second electrode lead-out portions at another portion thereof; and a connector mounted on said external circuit substrate for connecting electrically said two transparent electrodes of the respective liquid crystal display panels with an external drive circuit through said external circuit substrate.

2. A multi-layered liquid crystal display device according to claim 1, in which said connector is electrically connected to said transparent electrodes by means of an anisotropically electroconductive film connector disposed on said external circuit substrate.

3. A multi-layered liquid crystal display device according to claim 1 or 2, in which said external circuit substrate comprises a flexible print substrate.

4. A multi-layered liquid crystal display device according to claim 1, in which said liquid crystal display panels comprise panels of the same shape.

5. A multi-layered liquid crystal display device according to claim 1, in which said one of said liquid crystal display panels further includes two third electrode lead-out portions extending respectively together with said two transparent electrodes thereof in said one identical direction outwardly from the display area thereof, a predetermined distance is kept between said first electrode lead-out portions and said third electrode lead-out portions, said external circuit substrate is inserted between said third electrode lead-out portions at one end thereof.

* * * * *